No. 841,126.

PATENTED JAN. 15, 1907.

H. E. DECKEBACH.
PROCESS OF COOLING WORT.
APPLICATION FILED SEPT. 24, 1906.

Witnesses
C. W. Miles.
A. McCormack.

Inventor
Henry E. Deckebach
By Walter F. Murray
Attorney

THE NORRIS PETERS CO., WASHINGTON, D. C.

UNITED STATES PATENT OFFICE.

HENRY E. DECKEBACH, OF CINCINNATI, OHIO.

PROCESS OF COOLING WORT.

No. 841,126.

Specification of Letters Patent.

Patented Jan. 15, 1907.

Application filed September 24, 1906. Serial No. 335,873.

*To all whom it may concern:*

Be it known that I, HENRY E. DECKEBACH, a citizen of the United States of America, and a resident of Cincinnati, county of Hamilton, State of Ohio, have invented certain new and useful Improvements in Processes of Cooling Wort, of which the following is a specification.

The object of my invention is a process of cooling wort either after it has undergone partial fermentation or full fermentation by means of which the time required for cooling an amount of wort is greatly reduced and in which the wort may at the same time be cleansed from impurity and dead yeast-cells and from the presence of albuminoids.

Figure 1:
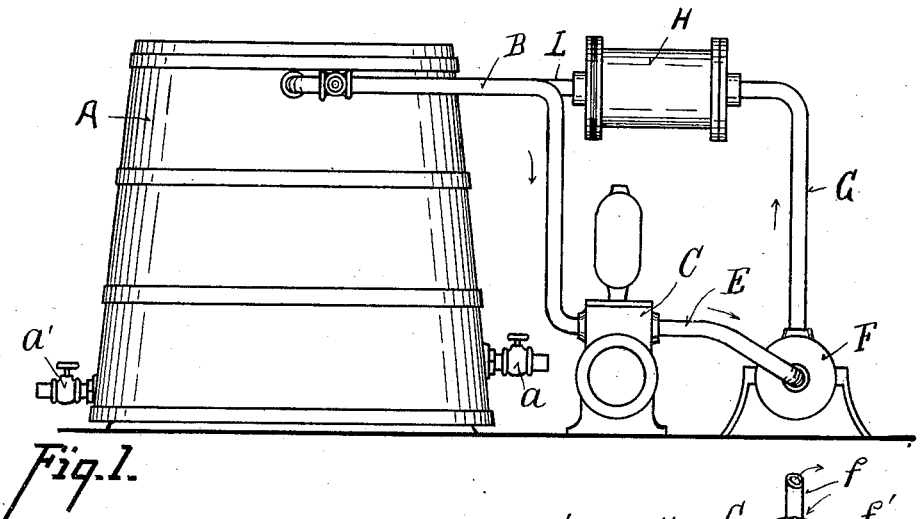
Figure 2:
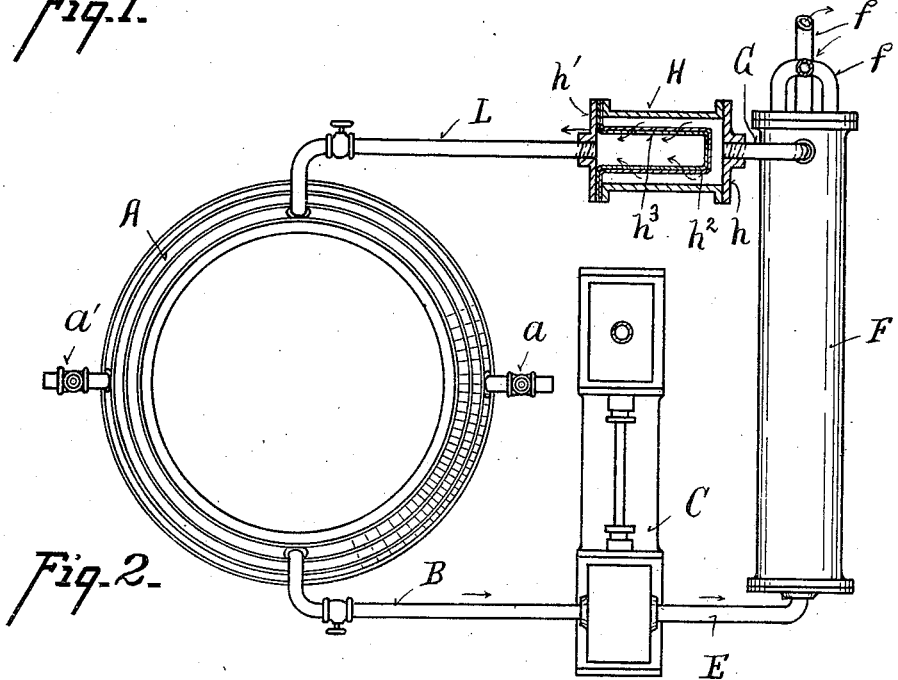

In the figures I have illustrated an apparatus by means of which my process may be carried on, Figure 1 being a side elevation, and Fig. 2 being a plan view, of the apparatus, with the exception of the strainer, which is shown in horizontal section.

Where the process is used with a wort after a partial fermentation, the steps taken are as follows: The wort, which contains, as usual, twelve per cent. extract, is led from the coolers (not shown) to the fermenting-tub A at a temperature of about 42° Fahrenheit, where it receives its yeast. The fermentation is then allowed to proceed until the wort has reached about 48° Fahrenheit, at which time it will be found to contain about six per cent. extract. The yeast will then be partly settled to the bottom of the tub A. Upon the surface there may be floating some dead yeast-cells and some impurities. The wort is then drawn from the top of the tub A through pipe B, which enters the tub near its top, the wort being carried by pump C through pipe E, thence through cooler F, being returned from the cooler through the pipe G into the strainer H, and thence through pipe L to the top of the tub A. The pipe L enters the tub A at the top of the tub and at a point diametrically opposite the point at which the pipe B enters the tub. The cooler F has within it a double coil of pipe $f\, f'$, through which brine or ammonia may be passed, the wort passing through the shell of the cooler F around the cooling-pipes $f\, f'$. The brine or ammonia is regulated so that the wort upon leaving the cooler through the pipe G will have been cooled to a temperature of about 30° Fahrenheit.

The strainer H consists of a cylinder having heads $h\, h'$, the head $h'$ holding a cloth strainer $h^2$ over the wire strainer $h^3$, as shown in Fig. 2. In passing through the cooler F albuminoids which may be contained in the wort are coagulated by the reduced temperature and are retained by the strainers $h^2\, h^3$ in the cylinder of the strainer. Likewise if there be any impurities or dead yeast-cells floating upon the top of the wort these will be drawn off through the pipe B and be retained by the strainer.

The cooled wort returned to the top of the tub by pipe L will lower the temperature and cause all floating yeast-cells to settle and will by reason of its greater density sink to the bottom of the tub and cause the warmer wort to rise to the top. Thus there is a circulation of the wort, the warmer wort passing toward the exit-pipe B. The pump is kept working carrying the wort through the cooler until all of the wort in the tub has been reduced to about 32° Fahrenheit.

The wort may be drawn off through the cock $a$ and the yeast through the cock $a'$. This yeast will be found to be a perfectly-clean yeast—that is, one which is free from albuminoids and other impurities.

Where my process is used with a wort in which full fermentation is allowed to take place in the tub A, instead of drawing off the wort when it reaches 48° Fahrenheit the fermentation may be allowed to go on until the amount of extract is shown by test to have been reduced to about two and one-half per cent., which is known as a "full" fermentation. Then the wort is drawn off, as above described.

By drawing off the wort from the top of the tub and after it has been cooled returning it again to the top of the tub while there is a circulation of the wort sufficient to cause it all to be passed through the cooler this is accomplished without agitating the yeast in the bottom and without causing it to be stirred up through the body of the wort.

What I claim is—

1. The process of cooling wort consisting in withdrawing it from the top of the fermenting-tub, passing it through a cooler, and then returning it to the top of the tub.

2. The process of cooling wort consisting in withdrawing it from the top of the fermenting-tub, passing it through a cooler, and returning it to the top of the tub at the opposite side from that from which it was withdrawn.

3. The process of cooling wort which consists in withdrawing it from the top of the fermenting-tub, passing it through a cooler, and a strainer, and returning it again to the top of the tub.

HENRY E. DECKEBACH.

Witnesses:
WALTER F. MURRAY,
AGNES McCORMACK.